United States Patent [19]

Kay et al.

[11] Patent Number: 4,579,928

[45] Date of Patent: Apr. 1, 1986

[54] URETHANE COMPOSITIONS

[75] Inventors: Edward L. Kay, Akron; Kenneth B. Roskos, Clinton, both of Ohio

[73] Assignee: The Firestone Tire & Rubber Company, Akron, Ohio

[21] Appl. No.: 724,691

[22] Filed: Apr. 18, 1985

[51] Int. Cl.[4] ...................... C08G 18/10; C08G 18/12
[52] U.S. Cl. .......................................... 528/59; 528/60; 528/61; 528/62; 528/63; 528/64; 528/65; 528/66
[58] Field of Search ...................... 528/59, 60, 61, 62, 528/63, 64, 65, 66

[56] References Cited

U.S. PATENT DOCUMENTS 3,697,483  10/1972  Damusis ................................. 528/60
4,267,299  5/1981  Oechsle ................................. 528/60
4,532,316  7/1985  Henn ..................................... 528/60

*Primary Examiner*—Maurice J. Welsh
*Attorney, Agent, or Firm*—Daniel N. Hall

[57] ABSTRACT

Urethane elastomers are produced by initially adding at least one incremental amount of a curing agent to a urethane prepolymer, having free polyisocyanate therein. Generally, free polyisocyanate-curing agent adducts are precipitated. Subsequently, the remaining amount of curing agent is added. Chain extension, accordingly, is favored which produces hard segment domains more evenly distributed in the polymer chain and imparts improved physical properties such as hardness, tear strength and high-low strain modulus.

20 Claims, No Drawings

URETHANE COMPOSITIONS

TECHNICAL FIELD

The present invention relates to the incremenatal addition of a curing agent to a urethane prepolymer containing free diisocyanate or polyisocyanate. More specifically, it relates to the precipitation of curing agent adducts of the free diisocyanate contained in a urethane prepolymer thereby enhancing the probability of the chain extender reacting with the NCO functions bound to the prepolymer soft segments relative to the reaction of the extender with the free diisocyanate to form higher molecular weight adducts.

BACKGROUND

Heretofore, urethane polymers have been prepared by the addition of curing agents such as diols, triols, diamines, amino alcohols, and the like to urethane prepolymers. The addition was generally continuous, as over a short period of time, or in bulk, that is all of the curing agent added at one time. This would be true of "RIM" (reaction injection molding) processes in which polyols/diisocyanates/curing agent are continuously mixed and injected into a mold for curing as well as for "LIM" (liquid injection molding) processes in which a liquid urethane prepolymer is mixed with a curing agent and injected into a mold for curing.

SUMMARY OF THE INVENTION

Accordingly, it is an aspect of the present invention to provide a urethane composition which is prepared using at least one incremental addition of a curing agent.

It is yet another aspect of the present invention to provide a urethane composition, as above, wherein the elastomer has improved physical properties over an elastomer produced by a conventional non-incremental addition of a curing agent. These and other aspects of the present invention are set forth in detail in the specification.

In general, a urethane composition comprised of the reaction product of (A) a urethane prepolymer having free polyisocyanate therein and (B) at least one initial incremental amount of a curing agent with an insoluble product produced thereby, and wherein the remaining amount of said (B) curing agent is subsequently added.

PREFERRED EMBODIMENTS

Urethane prepolymers generally contain free diisocyanate therein in that an exceas of the diisocyanate is generally utilized in the reaction with an intermediate, that is a low molecular weight polymer with hydroxyl or amine end groups. According to the present invention, urethane elastomers are produced by at least one incremental addition of a curing agent (i.e. chain extender) to the urethane prepolymer with the remaining amount of the curing agent subsequently added. It is an important aspect of the present invention that an insoluble product be produced via the incremental addition which product is the addition product of the free diisocyanate and the curing agent. Accordingly, the present invention relates primarily to urethane prepolymer-curing agent systems which produce such insoluble products upon the incremental addition of the curing agent. By the term "insoluble", it is meant that a visible precipitate forms. Naturally, the insolubility of the adduct will tend to vary with the prepolymer, type of curing agent, and the like. Broadly, the increment of curing agent can be added to the prepolymer formulation prior, during or subsequent to the prepolymer formation reaction with the stipulation that insoluble diisocyate/curing agent adducts be formed.

The intermediate or low molecular weight polymer such as a polyether containing hydroxyl or amine end groups utilized in accordance with the present invention is generally referred to as a polyol or polyamine and is characterized by two or more hydroxyl and/or amine groups which react with isocyanate functions of a diisocyanate. Generally, the hydroxyl and/or amine functions are limited to two per molecule as well as two isocyanates per molecule of polyisocyanate to obtain a linear (non-crosslinked) polyurethane when cured with a difunctional curing agent. If a crosslinked polyurethane is desirable, a trifunctional agent may be utilized such as a triol, triamine, triisocyanate or trifunctional extender.

General examples of suitable intermediates include poly(isobutene)diol, poly(butadiene)diol, poly(oxyethylene)diol, poly(oxypropylene)diol, poly(oxybutylene)diol, poly(caprolactone)diol, polyester diols and the like as well as the triols and analogous amine derivatives.

The intermediate is then reacted with a diisocyanate to form the prepolymer. Suitable polyisocyanates include those having the formula $R-(N=C=O)_n$, where R can be an aliphatic containing from about 2 to about 20 carbon atoms, a cycloaliphatic containing from 4 to about 20 carbon atoms, an aromatic containing from 6 to about 20 carbon atoms, or combinations thereof, as for example, alkyl-substituted aromatics. Desirably R is an aromatic or an alkyl substituted aromatic group having from 6 to 14 carbon atoms. The number of isocyanate units, that is "n" is an integer such as 2, 3 or higher with 2 being highly preferred. Examples of polyisocyanates include the following as well as isomers thereof; diphenyl diisocyanates; 2,4,4'-triisocyanate diphenyl ether; triphenylmethane triiosocyanate; benzene-1,2,4-triiosocyanate; naphthalene-1,3,7-triisocyanate and the like. Highly preferred polyisocyanates include meta or para-phenylene diisocyanate; diphenylmethane diisocyanates; bitolylene diisocyanates; dianisidine diisocyanates; isophorone diisocyanates; toluene diisocyanates; hexamethylene diisocyanate; pentamethylene diisocyanate; and MDI; that is 4,4'-diphenylmethane diisocyanate.

As noted above, generally an excess amount of the diisocyanate is utilized in the prepolymer formation reaction resulting in the existence of free diisocyanates. The amount of such free diisocyanates is generally expressed as "free isocyanate" (NCO) and as a weight percent of the prepolymer calculated as NCO and ranges from about 1.0% to about 20.0%, more typically from about 4.% to about 16% and usually from about 8% to about 12% NCO groups based upon the total weight of the prepolymer.

According to the present invention, a portion (increment) of the curing agent is added prior to, during or subsequent to the prepolymer formation reaction such that insoluble diisocyanate/curing agent adducts of relatively low molecular weight are formed. The remaining curing agent is subsequently added to the prepolymer/insoluble diisocyanate curing agent adducts suspension to effect reaction (chain extention) of the prepolymer via reaction of the soluble isocyanate functions attached to the prepolymer with the soluble reactive functions of the curing agent thus favoring chain extension to a higher molecular weight polyurethane. The insoluble adducts do not significantly enter into the chain-extension reaction at the chain-initiation temperature. Although we intend not to be limited by theory, it is theorized that at cure temperature, the insoluble adducts are solubilized and enter into the chain-extension reaction resulting in a more even distribution of hard segments and resulting in improved physical properties of the polyurethane as compared to polyurethanes prepared by the conventional manner of adding all of the curing agent at one time.

Such types of curing agents are generally highly polar compounds which react with the diisocyanate to form highly polar adducts which are insoluble in the relatively less polar reaction mixture. Generally, desirably curing or chain extending agents include low molecular weight polyol or amines having from 2 to about 12 carbon atoms and preferably from about 4 to about 8 carbon atoms. Although aliphatic compounds can be used, alkyl, aromatic or alkyl substituted aromatic compounds can be used to advantage.

Suitable types of polyols which produce insoluble adducts with diisocyanates are low molecular weight alkyl diols such as ethylene glycol, 1,3-propanediol, 2-methyl-1,3-propanediol, 1,4-butanediol and the like. Amine analogues of the listed polyols can also be used such as alkyl amines as well as mixed amine/ols such as ethanol amine, 3-aminopropanol and the like. Aromatic amines such as o, m or p-phenylenediamine and the like can also be used. Aminophenols such as o-, m- or p-aminophenol and the like can also be used.

The amount of polyol curing agent used is such that the equivalent OH/NCO ratio is from about 0.80 to 1.20, desirably from about 0.95 to 1.05 and preferably about 1.00. The incremental amount of the extender is added in one or more steps as up to 5 steps with desirably 1 or 2 steps being utilized and with 1 step being preferred. The initial incremental amount of curing agent added generally ranges from about 1% to about 40% and more preferably from about 5% to about 20%, based upon the total overall amount by weight of said curing agent being added to produce the cured urethane elastomer at the desired OH/NCO ratio. The reaction of the curing agent with the prepolymer is generally carried out in the presence of an anhydrous inert gas such as nitrogen.

Generally, the increment of curing agent is added at relatively high temperature to ensure rapid and complete reaction of the curing agent with the diisocyanate to form the desired adducts. Low temperatures are preferably used to ensure complete precipitation of the adducts. For example, the incremental addition of curing agent can be effected at about from 25° C. to 180° C. and preferably at the temperature at which the prepolymer is formed so that no additional energy is required to lower or increase the temperature of the reaction mixtures.

Often a lower incremental addition temperature is desired to ensure complete precipitation of the adduct. A preferred temperature would be the temperature at which the remaining amount of curing agent is added so that additional energy is not required to change the temperature of the reaction mixture. For example, the minimum temperature would be the temperature at which the free diisocyanate would crystalize from the reaction mixture. Accordingly, an incremental addition temperature of about 25° C. to about 70° C. will ensure essentially complete precipitation of the adducts. The preferred temperature would be from about 30° to 60° with 40° C. being the most preferred to minimize dimerization of the diisocyanate still left in the reaction mixture.

The reaction resulting from the incremental addition of extender is a competitive reaction in that some of the curing agent may actually react with the prepolymer. However, under the reaction conditions specified, the reaction with the free diisocyanate is favored.

If desired, at least another incremental addition step can be carried out in the same manner as set forth above wherein the amount of the curing agent for each incremental step is within the above-noted range. Once the various incremental steps have been completed and an insoluble adduct formed, the total remaining amount of the curing agent is then added to form the final urethane elastomer product. The addition of the remaining amount of curing agent is also carried out in the presence of an anhydrous inert gas. The temperature of this reaction, often referred to as a chain extending reaction is generally from about ambient up to the boiling point of the curing agent, e.g. about 180° C. with a range of from about 30° C. to about 100° C. being preferred. The final product is a relatively highly chain-extended polyurethane having hard, that is urethane linkages or sites therein which impart overall increased physical properties to the polymer. The insoluble adducts are either retained as a separate insoluble component which will nucleate the separation of hard segments or if cured at sufficient high temperature, will become soluble in the reaction mixture and will partake in the chain-extension reaction.

Since the reaction mixture is cured in a steel mold, no direct observations could be made during the curing of the mixture. Although we do not intend to be limited by theory, it is believed that because of the depleted amount of diisocyanate (converted to an insoluble adduct) the reaction of the curing agent with the isocyanate functions attached to the prepolymer becomes more favorable. Concurrently, the reaction of the curing agent with free diisocyanate becomes less favorable which essentially limits the molecular weight of any additional polyisocyanate/curing agent adducts formed. At cure temperatures of about 120° C. to about 200° C. and preferably from about 130° C. to 160° C., some of the adducts formed by the incremental addition of the curing agent becomes soluble and partake in the chain-extension reaction. The overall effect is that the hard segments are more evenly distributed in the urethane polymer chain and are more effective reinforcing sites leading to enhanced physical properties of the cured polyurethane. Adducts which are not solubilized at the cure temperature because of limited cure time, function as nucleating sites for the uniform phase separation of the hard segments.

Urethane elastomers of the present invention have higher tear strength, higher low strain moduluii, hardness, and the like. Inasmuch as a product having improved physical properties is the result, less of the expensive diisocyanate can be utilized in various situations which reduces the cost of the product.

Urethane elastomers of the present invention can be utilized wherever such properties are desired as for an example in cast tires, and to a lesser extent in conveyor belts. Because of the wide range of properties attainable by the process of this invention, very high modulus polyurethanes suitable for molded articles and the like are attainable.

GENERAL EXPERIMENTAL PROCEDURES

1. Prepolymer Formation: The general procedure for the preparation of prepolymers was to add molten MDI (ca.40° C.) to the polyol or blend of polyols. The MDI/polyol was heated under vacuum (<5 torr) for 30 minutes at 100-110° C., cooled and stored under a nitrogen atmosphere at 40° C.

An alternative method was to add the MDI to the polyol or blend of polyols at 70° C. and heating the reaction mixture for two hours at 70° C. The prepolymer was stored under N2 at 40° C.

The amount of MDI added to the polyol was calculated as follows:
   (1) Based on the hydroxyl number of the polyol, the number of moles of hydroxyl function was calculated.
   (2) The moles of hydroxyl function were converted to weight of MDI in a ratio of [OH]/MDI.
   (3) The weight of MDI required to attain a desired level of "free NCO" (the amount of NCO function that theoreticaly would not have reacted during the prepolymer formation) was calculated.
   (4) The weight of MDI calculated in item (2) and (3) was the total amount of MDI used in the prepolymer formation reaction.

Prepolymers prepared by the general procedure were usually clear colorless liquids. Viscosities of the prepolymers depended upon the level of "free NCO" used.

2. Incremental Addition of Extender: The general procedure for effecting an incremental addition of the extender was to calculate the total weight of BDO required to react with the prepolymer so that the stoichiometry would be in a ratio of OH/NCO=1.00.

The desired level of extender increment was then calculated as a percent of the total amount of BDO required for a OH/NCO=1.00. This amount of extender increment was then added to the prepolymer at 45° C. Alternately the extender increment was added at 70° C. and in some experiments at 110° C.

Depending upon the amount of extender increment, the reaction mixture was either stored under nitrogen at 40° C. until the MDI/BDO adducts precipitated as a white solid or the reaction mixture was cooled to the desired chain extension temperature and chain-extended. Specifically, extender increments of about 2% to 10% required a finite time to effect precipitation of the MDI/BDO adducts and thus were stored until the adducts precipitated. Extender increments of about 10% to 30% higher usually resulted in precipitation of the MDI/BDO adducts relatively rapidly and were chain-extended as soon as the desired chain-extension temperature was attained.

The amount of chain-extender used was corrected for the amount of extender added as an increment so that the final ratio of OH/NCO in the polyurethane was theoretically 1.00.

The prepolymers after the addition of the extender increment were usually opaque white fluids (dispersion of the adducts in prepolymer). Depending upon the amount of extender increment, the fluids varied in viscosities; the larger the extender increment, the higher the viscosity. The increased viscosities have an indirect beneficial effect in that during the centrifugal casting, the higher viscosity charge will flow more uniformily and minimizes splashing which leads to skin formation on the cast article.

3. Chain Extension/Cure Conditions: The chain-extension reaction was effected by adding the required amount of BDO to the prepolymer/adduct dispension at between 35° C. and 55° C.; generally 40° C. and degassing the mixture under vacuum. As a matter of full disclosure, the chain extension reaction was generally effected with butanediol containing 0.001 wt % of phosphoric acid (85% reagent grade) which is believed to function as a catalyst. Some examples utilize only butanediol. A similar amount of phosphoric acid was used to improve hot demold strength and generally did not affect stress-strain properties. All examples except Nos. 28, 38, 51, 53 and 60-62 were conducted utilizing butanediol containing 0.001 wt % of phosphoric acid.

After complete mixing of the chain-extender/prepolymer/adduct, the reaction mixture was transferred into a 6"×6"×0.075" mold and cured at 140° C. (unless otherwise specified) for 30 minutes in a Wabash hydraulic press at 10 to 15 tons gauge pressure.

4. Physical Testing: The 5% modulus and tear strength results were determined on an Instron Test Machine using test procedures generally accepted in the rubber and plastics industries.

POLYOLS IDENTIFICATION

Voranol 5148, a product of Dow Chemical identified as a poly(oxypropylene) triol having approximately 20% poly(oxyethylene) glycol endblock; 7000 nominal molecular weight.

Voranol 2120, a product of Dow Chemical identified as a poly(oxypropylene)diol; 2000 nominal molecular weight. Carbowax 400, a product of Union Carbide identified as a poly(oxyethylene)glycol; 400 nominal molecular weight.

Carbowax 1000, a product of Union Carbide identified as a poly(oxyethylene)glycol; 1000 nominal molecular weight.

Poly(butadiene)diol, a product of Aldrich Chemical, microstructure, 20% vinyl, 20% cis-1,4, 60% trans-1,4; hydroxyl number determined, 53.0 mg KOH/gram.

Poly(caprolactone)diol, a product of Aldrich Chemical, average molecular weight 1250.

Polymeg 1000, a product of Quaker Oats, identified as a poly(oxytetramethylene)glycol of 1000 molecular weight.

REAGENTS IDENTIFICATION AND SOURCE

MDI; 4,4-diphenylmethane diisocyanate; a product of Upjohn Chemical.

BDO; butanediol-1,4; a product of DuPont Chemical.

TABLE I

VARIATION OF EXTENDER INCREMENT AMOUNT
90 Parts Voranol 5148/10 Parts Carbowax 400
MDI Prepolymer; 11.0% Free NCO; OH/NCO = 1.00

| Experiment No. | 1 | 2 | 3 | 4 | 5 | 6 |
|---|---|---|---|---|---|---|
| % BDO Increment | — | 1.0 | 2.5 | 5.0 | 7.5 | 10.0 |
| 5% Modulus psi At | | | | | | |
| 25° C. | 670 | 635 | 730 | 760 | 855 | 955 |
| 100° C. | 440 | 425 | 530 | 555 | 565 | 670 |

TABLE II

VARIATION OF EXTENDER INCREMENT AMOUNT[1]
90 Parts Voranol 5148/10 Parts Carbowax 400
MDI Prepolymer; 8.95% Free NCO; OH/NCO = 1.00

| Experiment No. | 7 | 8 | 9 |
|---|---|---|---|
| % BDO Increment | — | 20.0 | 30.0 |
| 5% Modulus psi At | | | |
| 25° C. | 255 | 480 | 485 |
| 100° C. | 165 | 380 | 375 |

[1]Test plaques prepared immediately after precipitation of adducts.

TABLE III

VARIATION IN FREE NCO CONTENT
90 Parts Voranol 5148/10 Parts Carbowax 400
MDI Prepolymers; BDO Extender; OH/NCO = 1.00

| Experiment No. | 10 | 11 | 12 | 13 | 14 | 15 | 16 | 17 | 18 | 19 | 20 | 21 | 22 | 23 |
|---|---|---|---|---|---|---|---|---|---|---|---|---|---|---|
| % BDO Increment | — | 10.0 | — | 10 | — | 10 | — | 10 | — | 10 | — | 10 | — | 10 |
| % Free NCO | 8.0 | 8.0 | 9.0 | 9.0 | 10.0 | 10.0 | 11.0 | 11.0 | 12.0 | 12.0 | 13.0 | 13.0 | 14.0 | 14.0 |
| 5% Modulus, psi, At | | | | | | | | | | | | | | |
| 25° C. | 310 | 385 | 225 | 505 | 410 | 655 | 670 | 955 | 830 | 1135 | 920 | 1300 | 1235 | 1705 |
| 100° C. | 155 | 300 | 165 | 390 | 265 | 505 | 440 | 670 | 580 | 705 | 570 | 850 | 705 | 1125 |

TABLE IV

VARIATION OF EXTENDER INCREMENT AMOUNT
90 Parts Voranol 5148/10 Parts Carbowax 1000
MDI Prepolymer; 11.83%, Free NCO; OH/NCO = 1.00

| Experiment No. | 24 | 25 | 26 | 27 |
|---|---|---|---|---|
| % BDO Increment | — | 2.5 | 5.0 | 7.5 |
| 5% Modulus, psi, At | | | | |
| 25° C. | 575 | 825 | 970 | 915 |
| 100° C. | 465 | 600 | 675 | 700 |

TABLE V

EFFECT OF INCREMENTAL EXTENDER ADDITION ON HARDNESS, 5% MODULUS, TEAR STRENGTH
Voranol 5148 MDI Prepolymer, OH/NCO = 1.00

| Experiment No. | 28 | 29 | 30 | 31 | 32 | 33 | 34 | 35 | 36 |
|---|---|---|---|---|---|---|---|---|---|
| % Free NCO | 8.83 | 8.83 | 8.83 | 9.76 | 9.76 | 9.76 | 10.90 | 10.90 | 10.90 |
| % BDO Increment | — | 5.0 | 10.0 | — | 5.0 | 10.0 | — | 5.0 | 10.0 |
| Shore A Hardness | 86 | 92 | 91 | 92 | 94 | 93 | 93 | 95 | 93 |
| 5% Modulus, psi, At | | | | | | | | | |
| 25° C. | 260 | 455 | 430 | 410 | 630 | 625 | 530 | 785 | 735 |
| 100° C. | 180 | 345 | 305 | 305 | 430 | 450 | 375 | 585 | 530 |
| Tear Strength, lbs/Inch At | | | | | | | | | |
| 25° C. | 294 | 395 | 386 | 418 | 467 | 474 | 457 | 543 | 530 |
| 100° C. | 251 | 277 | 312 | 333 | 343 | 337 | 331 | 406 | 351 |

TABLE VI

EFFECT OF INCREMENTAL EXTENDER ADDITION DURING PREPOLYMER FORMATION REACTION
90 Parts Voranol 5148/10 Parts Carbowax 400
Reacted With MDI and BDO (When Charged),
10% Free NCO, OH/NCO 1.00

| Experiment No. | 37 | 38 | 39 |
|---|---|---|---|
| % BDO Charged | — | 10.0 | 20.0 |
| 5% Modulus, psi, At | | | |
| 25° C. | 410 | 470 | 710 |
| 100° C. | 265 | 350 | 505 |

TABLE VII

EFFECT OF CURE TEMPERATURE
90 Parts Voranol 5148/10 Parts Carbowax 400
MDI Prepolymers; 9.88% Free NCO; OH/NCO = 1.00
30 Minute Cure

| Experiment No. | 40 | 41 | 42 | 43 | 44 | 45 |
|---|---|---|---|---|---|---|
| % BDO Increment | — | — | — | 5.0 | 5.0 | 5.0 |
| Cure Temperature °C. | 140 | 160 | 180 | 140 | 160 | 180 |
| 5% Modulus, psi, At | | | | | | |
| 25° C. | 390 | 195 | 180 | 635 | 680 | 405 |
| 100° C. | 290 | 125 | 135 | 490 | 475 | 280 |

TABLE VIII

EFFECT OF STOICHIOMETRY
90 Parts Voranol 5148/10 Parts Carbowax 400
MDI Prepolymers, 9.88% Free NCO

| Experiment No. | 46 | 47 | 48 | 49 | 50 |
|---|---|---|---|---|---|
| % BDO Increment | — | 5.0 | 5.0 | 5.0 | 5.0 |
| OH/NCO | 1.00 | 0.90 | 0.95 | 1.00 | 1.05 |
| 5% Modulus, psi, At | | | | | |
| 25° C. | 390 | 710 | 695 | 625 | 670 |
| 100° C. | 290 | 545 | 525 | 490 | 510 |

TABLE IX

VARIATION OF PREPOLYMER
90 Parts Voranol 5148/10 Parts Polymeg 1000
MDI Prepolymer, 10.0% Free NCO, OH/NCO = 1.00

| Experiment No. | 51 | 52 | 53 |
|---|---|---|---|
| % BDO Increment | — | 10.0 | 20.0 |
| 5% Modulus, psi, At | | | |
| 25° C. | 355 | 570 | 510 |

TABLE IX-continued
VARIATION OF PREPOLYMER
90 Parts Voranol 5148/10 Parts Polymeg 1000
MDI Prepolymer, 10.0% Free NCO, OH/NCO = 1.00

| Experiment No. | 51 | 52 | 53 |
|---|---|---|---|
| 100° C. | 300 | 470 | 415 |

TABLE X
VARIATION OF PREPOLYMER
90 Parts Voranol 5148/10 Parts Poly(butadiene)glycol
MDI Prepolymer, 10% Free NCO, OH/NCO = 1.00

| Experiment No. | 54 | 55 |
|---|---|---|
| % BDO Increment | — | 10.0 |
| 5% Modulus, psi, At | | |
| 25° C. | 300 | 498 |
| 100° C. | 320 | 345 |

TABLE XI
VARIATION OF PREPOLYMER
90 Parts Voranol 5148/10 Parts Poly(caprolactone)diol,
MDI Prepolymers, 10% Free NCO, OH/NCO = 1.00

| Experiment No. | 56 | 57 |
|---|---|---|
| % BDO Increment | — | 10.0 |
| 5% Modulus, psi, At | | |
| 25° C. | 405 | 645 |
| 100° C. | 260 | 425 |

TABLE XII
VARIATION OF PREPOLYMER
Voranol 2120 MDI Prepolymer, 10% Free NCO, OH/NCO = 1.00

| Experiment No. | 58 | 59 |
|---|---|---|
| % BDO Increment | — | 10.0 |
| 5% Modulus, psi, At | | |
| 25° C. | 420 | 580 |
| 100° C. | 330 | 420 |

TABLE XIII
VARIATION OF PREPOLYMER
Poly(oxytetramethylene)diol MDI Prepolymer,
11.0% Free NCO, OH/NCO = 1.00

| Experiment No. | 60 | 61 | 62 |
|---|---|---|---|
| % BDO Increment | — | 5.0 | 10.0 |
| 5% Modulus, psi, At | | | |
| 25° C. | 465 | 675 | 720 |
| 100° C. | 280 | 460 | 450 |

TABLE XIV
INCREMENTAL ADDITION OF ETHYLENE GLYCOL EXTENDER
90 Parts Voranol 5148/10 Parts Carbowax 400,
MDI Prepolymer, 10% Free NCO, OH/NCO = 1.00

| Experiment No. | 63 | 64 |
|---|---|---|
| % Ethylene Glycol Increment | — | 20.0 |
| % BDO Extender | 100.0 | 80.0 |
| 5% Modulus psi, At | | |
| 25° C. | 410 | 580 |
| 100° C. | 265 | 475 |

EXPERIMENTAL RESULTS

As will be discussed following, the beneficial effects of adding an increment of an extender prior to the complete chain-extension of a prepolymer and chain-extending after the MDI/extender adducts have precipitated were principally an increase in low strain modulus (5% modulus).

The increased 5% modulus is desirable because the final value is attained at the same level of hard segments as the controls which utilized the conventional method of adding (mixing) all of the chain-extender at one time. Thus, a higher desired level of 5% modulus can be realized using the "extender-increment" procedure as compared to conventional procedures.

The "extender-increment" procedure also generally increases hardness levels at the same level of hard segments which is considered a definite advantage.

Another important advantage of the "extender-increment" procedure is that the precipitated adducts function as nucleating sites for the phase separation of soft and hard segments. Again, for the sake of full disclosure, test specimens of polyurethane prepared by the conventional procedure of adding all of the extender at once usually have a pattern of white-opaqueness on a background of translucent white. This pattern of white-opaqueness is believed to be caused by non-uniform separation of hard segments which may mean that, on a molecular level, the cured polyurethane is not uniform. By using the "extender-increment" technique, uniform translucent-white polyurethane test specimens are attained. The uniform translucent white specimens are believed to be more uniform on a molecular level than the specimens prepared by conventional procedures which do not effect precipitation of polyisocyanates/extender adducts prior to the main extension reaction. Uniformity of cured polyurethanes is very important relative to realizing ultimate physical properties and eliminating possible defects.

Another beneficial effect of the incremental extender technique is that the demolding strength of cured polyurethanes removed from a hot mold is higher than that of appropriate controls. The increase in hot demolding strength is difficult to measure quantitatively because of rapid cooling of the cured polyurethane when removed from the mold. However, under experimental conditions, the improved hot demolding strength is readily apparent to an experienced operator.

The improved hot demolding strength is of practical importance since it allows removal of a cured polyurethane from a hot mold with minimum distortion or damage to the cured article.

Referring to Table I, it should be noted that the control (Experiment No. 1 in which all of the required BDO for a stoichiometry of 1.00 was added at once) had 5% modulii of 670 and 440 psi at 25° and 100° C., respectively. In contrast, polyurethanes prepared with 2.5% to 10% BDO increments have 5% modulii values which progressively increase from 730 psi to 955 psi at 25° C. and from 530 psi to 670 psi at 100° C.

The effect of a 1% BDO increment is not shown in the modulii values which is indicative that about 2% of extender increment is required to obtain a beneficial effect of increased 5% modulus.

Data in Table II were reported to indicate that the extender-increment can be as high as 30% with realization of an increased 5% modulus value. It should be noted that the level of "free NCO" in the prepolymer is 8.95% in contrast to the 11.0% "free NCO" utilized in Table I. The effect of the "free NCO" level on the 5% modulii values attainable using the extender increment technique is shown in Table III.

As shown in Table III, the level of "free NCO" was varied from 8.0% to 14.0% and the amount of BDO extender increment held constant at 10%. In all experiments, the 5% modulii values of the extender-increment test specimens were significantly higher than the values obtained on the control experiments in which all of the extender was added at once. It should be noted that 5% modulii values ranging from 385 psi at 25° C. and 300 psi at 100° C. to 1705 psi at 25° C. and 1125 psi at 100° C. are attainable using the extender increment technique and varying the amount of "free NCO" from 8.0% to 14.0%.

These data indicate that the extender-increment procedure is effective over a wide range of prepolymer formulations and capable of preparing polyurethanes with a wide range of physical properties.

Data in Table IV are presented to demonstrate that the extender-increment technique is effective with a change in prepolymer composition. A 1000 molecular weight poly(oxyethylene) glyol was a component of the polyol blend used to prepare the prepolymer.

Table V summarizes data on a prepolymer based on a poly(oxypropylene) triol having approximately 20% poly(oxyethylene) glycol as end blocks. The "free NCO" level was varied from 8.83% to 10.90% and the increment of BDO held constant at 5% and 10%.

It should be noted that generally the Shore A hardness values increased with the BDO extender-increments as compared to the controls. The 5.0% BDO increment experiments result in the highest Shore A hardness values.

In all experiments, the BDO extender-increments resulted in higher 5% modulii values than the appropriate controls.

Tear strength values are also increased by the extender-increment technique as compared to the appropriate controls. The beneficial effect of increased tear resistance is more evident at the higher "free NCO" levels utilized.

Data in Table VI are presented to demonstrate that an extender-increment can be added prior to or during the prepolymer formation reaction. The results show a beneficial increase in 5% modulii values.

Referring to Table VII, it should be noted that the incremental extender technique is effective over a range of cure temperatures of 140° to 180° C. Considerable latitude in cure conditions is possible while still realizing the beneficial effect of the extender-increment technique of our invention.

Data in Table VIII are reported to demonstrate that the extender-increment technique is effective over a wide range of stoichiometries.

Data in Tables IX, X, XI and XII are presented to demonstrate that the extender increment technique is effective using significantly different types of polyols in the prepolymer formation reaction. As reported, the extender-increment technique is effective with prepolymers featuring blends of a poly(oxypropylene)triol end-capped with poly(oxyethylene)diol with a poly(oxytetramethylene)glycol on a poly(butadiene)glycol or a poly(caprolactone)diol. Data summarized in Tables XII and XIII demonstrates that the incremental technique is effective with a poly(oxypropylene)diol as well as poly(oxytetramethylene)diol prepolymers.

Data in Table XIV demonstrats that extenders other than BDO can be utilized as extender increments. In this experiment, ethylene glycol was used on the extender increment and the principal chain-extension reaction was effected with BDO.

It should be obvious to those skilled in the art of urethane formulations that ethylene glycol could also have been used as both the increment as well as principal extender. In addition. aliphatic and aromatic amines or mixtures thereof or other diols or triols or mixed amines/polyols would also be effective.

It should be known to a skilled polyurethane technologist that a trifunctional increment-extender would result in a "crosslinked" insoluble adduct and would be effective. The extender-increment need not be the same as the principal extender. For example, a low molecular weight diol could be used as the increment and a diamine or a "complexed" diamine such as a metal holide complex of an aromatic amine used as the principal extender.

While in accordance with the patent statutes, a best mode and preferred embodiment has been set forth in detail, the scope of invention is limited by the scope of the attached claims.

We claim:

1. A urethane composition, comprising:
the reaction product of (A) a urethane prepolymer having free polyisocyanate therein and (B) at least one initial incremental amount of a curing agent with an insoluble product being produced thereby, and wherein the remaining amount of said (B) curing agent is subsequently added.

2. A urethane composition according to claim 1, wherein said polyisocyanate has the formula R (N=C=O)n where R is an aliphatic containing from 2 to 20 carbon atoms, a cycloaliphatic containing from 4 to 20 carbon atoms, and an aromatic or aliphatic substituted aromatic containing from 6 to about 20 carbon atoms, or combinations thereof, and wherein the amount of free polyisocyanate expressed as a weight percent [NCO] of the prepolymer is from about 1.0% to about 20.0%.

3. A urethane composition according to claim 2, wherein the amount of curing agent utilized in said initial incremental addition is from about 1% to about 40% by weight based upon the total amount of curing agent utilized in forming said urethane elastomer and wherein the total amount of said curing agent is from about 0.80 to about 1.20 equivalents based upon the total number of isocyanate equivalents in said prepolymer.

4. A urethane composition according to claim 3, wherein said curing agent is a polyol, amine analogues thereof, aromatic amines, having from 2 to 12 carbon atoms, wherein said incremental addition of said curing agent with said prepolymer at a temperature from about 25° C. to about 180° C., and wherein said R of said polyisocyanate is an aromatic or an alkyl substituted aromatic.

5. A urethane composition according to claim 4, wherein the remaining amount of said curing agent is reacted with said prepolymer at a temperature from about ambient to about the boiling point of said curing agent.

6. A urethane composition according to claim 5, wherein said incremental addition temperature is to a formed urethane prepolymer and is from about 25° C. to about 70° C.; and wherein said remaining amount of said curing agent is reacted at from about ambient to about 180° C.

7. A urethane composition according to claim 5, wherein the amount of said free polyisocyanate in said prepolymer is from about 4% to about 16%, wherein said polyisocyanate is selected from the group consisting of meta or para-phenylene diisocyanates, diphenylmethane diisocyanates, bitolylene diisocyanates, dianisidine diisocyanates, isophorone diisocyanates, toluene diisocyanates, hexamethylene diisocyanate, and pentamethylene diisocyanate, wherein the initial amount of incrementally added curing agent is from about 5% to about 20%, and wherein said urethane prepolymer is selected from the group consisting of poly(isobutene)diol, poly(butadiene)diol, poly(oxyethylene)diol, poly(oxypropylene)diol, poly(oxybutylene) diol, poly(caprolactone)diol, polyester diols and the like as well as the triols and analogous amine derivatives.

8. A urethane composition according to claim 7, wherein said composition is cured at a temperature of from about 120° C. to about 200° C.

9. A urethane composition according to claim 8, wherein said polyisocyanate is MDI and wherein said curing agent is 1,4-butanediol.

10. A process for incrementally extending a urethane prepolymer and producing a urethane elastomer, comprising the steps of:
initially adding at least one incremental amount of curing agent to the urethane prepolymer, said urethane prepolymer containing free polyisocyanate therein;
precipitating free polyisocyanate-curing agent adducts;
subsequently adding the remaining amount of said curing agent to said urethane prepolymer and forming said urethane composition.

11. A process according to claim 10, wherein the reaction temperature of said incremental amount of said curing agent in urethane prepolymer is from about 25° C. to about 180° C. and wherein the reaction temperature of said remaining curing agent and said prepolymer is from about ambient to about 180° C.

12. A process according to claim 11, wherein the amount of said free polyisocyanate expressed as a weight precent [NCO] of said prepolymer, is from about 1.0% to about 20% of N=C=O, wherein the formulation of said polyisocyanate has the formula R(N=C=O)n where R is an aliphatic containing from 2 to 20 carbon atoms, a cycloaliphatic containing from 4 to 20 carbon atoms, and an aromatic or aliphatic substituted aromatic containing from 6 to about 20 carbon atoms, or combinations thereof.

13. A process according to claim 12, wherein said curing agent is a polyol, an amine analogue thereof, or an aromatic amine, having from 2 to 12 carbon atoms, wherein the amount of curing agent added in said incremental step is from about 1% to about 40% by weight based upon the total amount of curing agent added in said overall process and wherein the total amount of said curing agent is from about 0.80 to about 1.20 equivalents per N=C=O equivalent.

14. A process according to claim 13, wherein the amount of said free polyisocyanate in said prepolymer is from about 4% to about 16%, wherein the amount of incremental curing agent initially added is from 5% to about 20% by weight and wherein R of said polyisocyanate is an aromatic or a alkyl substituted aromatic and wherein said incremental addition is added during or after formation of said prepolymer.

15. A process according to claim 14, wherein said polyisocyanate is MDI and wherein said polyol is 1,4-butanediol.

16. A process according to claim 11, including carrying out said reaction of said remaining curing agent at a temperature from about 30° to about 100° C.

17. A process according to claim 14, including dissolving said precipitated free diisocyanate-curing agent adduct by carrying out said reaction of said remaining curing agent at a temperature from about 30° C. to about 100° C.

18. A process according to claim 11, wherein said prepolymer is selected from the group consisting of poly(isobutene)diol, poly(butadiene)diol, poly(oxyethylene)diol, poly(oxypropylene)diol, poly(oxybutylene)diol, poly(caprolactone)diol, polyester diols and the like as well as the triols and analogous amine derivatives.

19. A process according to claim 14, wherein said prepolymer is selected from the group consisting of poly(isobutene)diol, poly(butadiene)diol, poly(oxyethylene)diol, poly(oxypropylene)diol, poly(oxybutylene)diol, poly(caprolactone)diol, polyester diols and the like as well as the triols and analogous amine derivatives.

20. A process according to claim 17, wherein said prepolymer is selected from the group consisting of poly(isobutene)diol, poly(butadiene)diol, poly(oxyethylene)diol, poly(oxypropylene)diol, poly(oxybutylene)diol, poly(caprolactone)diol, polyester diols and the like as well as the triols and analogous amine derivatives.

* * * * *